United States Patent [19]

Steinhagen

[11] 3,783,710

[45] Jan. 8, 1974

[54] POWER TRANSMITTING DRIVE APPARATUS

[75] Inventor: Horst G. Steinhagen, Racine, Wis.

[73] Assignee: Twin Disc, Incorporated, Racine, Wis.

[22] Filed: Nov. 16, 1972

[21] Appl. No.: 307,103

[52] U.S. Cl. ............ 74/665 GA, 74/606 R, 74/325, 418/209, 418/199
[51] Int. Cl. .... F16h 37/06, F16h 3/08, F16h 57/02
[58] Field of Search .......... 74/325, 665 GA, 606 R; 418/199, 209

[56] References Cited
UNITED STATES PATENTS

| 2,732,745 | 5/1973 | Jackson | 74/325 |
| 3,698,265 | 10/1972 | Williams | 74/665 GA |
| 3,597,115 | 8/1971 | Jass | 417/313 |
| 2,481,047 | 9/1949 | Sloane | 418/199 |
| 2,432,825 | 12/1947 | Sloane | 418/209 |
| 1,148,478 | 7/1915 | Jepson | 74/665 GA |

*Primary Examiner*—Allan D. Herrmann
*Assistant Examiner*—P. S. Lall
*Attorney*—James E. Nilles

[57] ABSTRACT

A power transmitting drive apparatus for distributing power from a single power source to a plurality of outputs for driving various mechanism, such as fluid pumps. A fixedly located power input means is rotatably mounted in the housing and furnishes power to two intermediate gear means, the intermediate gear means then each transmitting the power to two output gear means which are attached to the load, such as fluid pumps or the like. The output gear means is at a fixed location in the housing and need not be changed. The intermediate gear means as well as the input gear means are changeable as to size and number of teeth to effect different gear ratio changes. The arrangement is such that the intermediate gears can be replaced with others of different size, but at the same time, the housing requires no additional mounting holes for mounting the intermediate gears in various positions. Instead, various types of gear support means are provided in fixed locations in the housing so as to be able to shift the center of rotation of the intermediate gears along a certain predetermined line.

3 Claims, 7 Drawing Figures

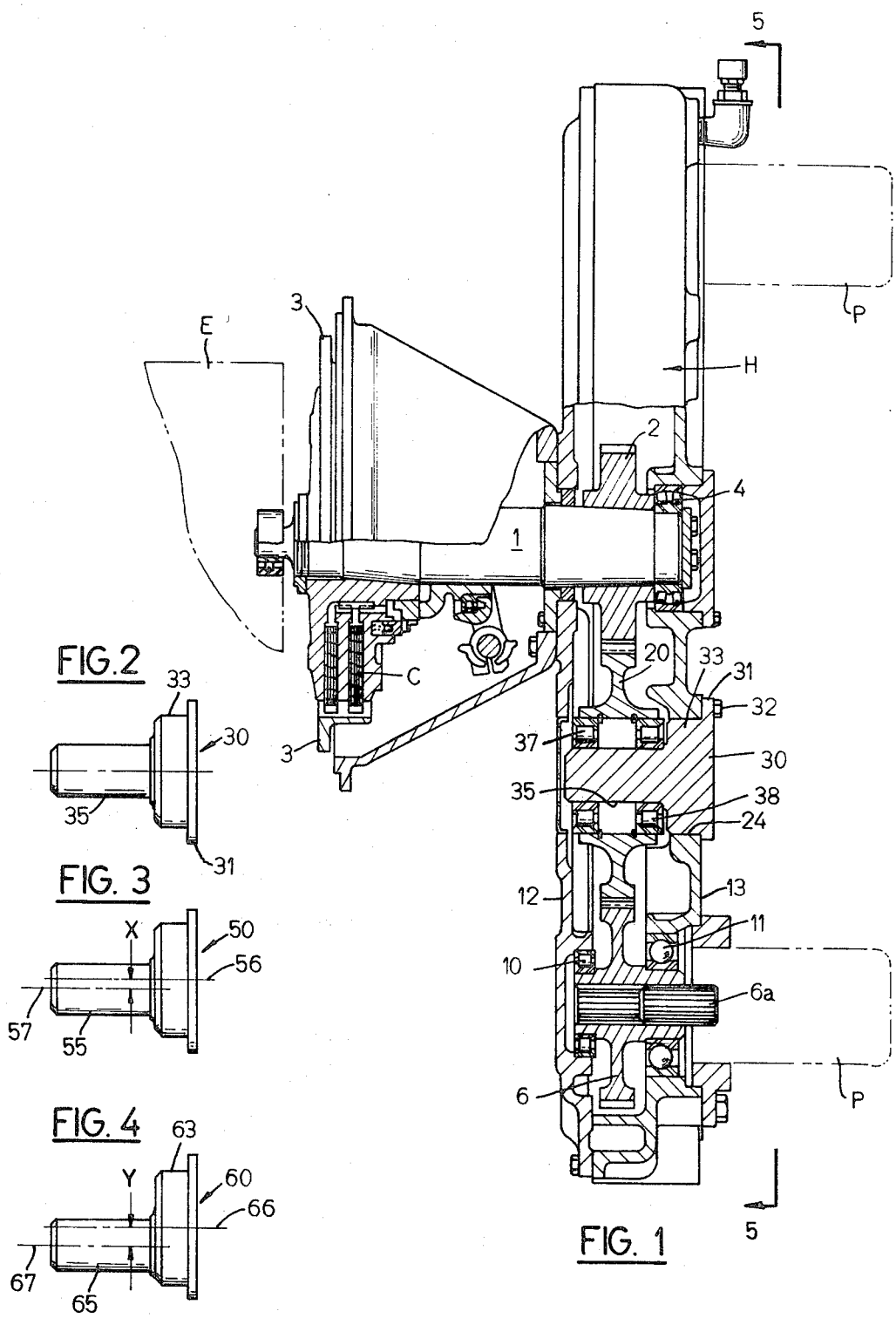

POWER TRANSMITTING DRIVE APPARATUS

BACKGROUND OF THE INVENTION

Various arrangements have been provided in the past for utilizing a single source of input power to drive a plurality of outputs such as individual fluid pumps or the like. Examples of such multiple pump drive arrangements are shown in the U.S. Pat. No. 2,432,825 which issued on Dec. 16, 1947.

Another example of power transmitting apparatus of the type to which the present invention pertains, is shown in the U.S. Pat. No. 3,698,265 which issued Oct. 17, 1972 to Williams and entitled "Power Transmitting Drive Apparatus". The apparatus shown in that patent utilized a housing having bosses or thick wall portions of sufficient size so that various holes could be drilled in the bosses for the purpose of locating the intermediate gear means in different positions within the housing to thereby effect change in gear ratios. That apparatus also showed an arrangement of intermediate and output gears which were symmetrically arranged in respect to the central input gear and whereby the intermediate gears were adjustable (by drilling different holes in the housing) along a line extending between the center of rotation of the input gear and the center of rotation of each of the intermediate gear means.

SUMMARY OF THE INVENTION

The present invention provides a power transmitting drive apparatus for distributing power from a single input gear to a plurality of output gears and through two adjustably located intermediate gears. The supports for an intermediate gear, regardless of the position of the intermediate gear, are located in a single or common opening in the housing. That is to say, different openings in the housing are unnecessary to accommodate the intermediate gears of various sizes. More specifically, the present invention provides a drive apparatus of the above type wherein the intermediate gears each have a support mounted in an opening in the housing, which support may be interchanged with others of different eccentricity, and furthermore which supports may be each rotated 180° so as to provide two positions for each intermediate gear selected. In this manner, three separate gear supports can accommodate five different sized intermediate gears.

These and other objects and advantages of the present invention will appear hereinafter as this disclosure progresses, reference being had to the accompanying drawings.

BRIEF DESCRIPTION OF THE DRAWINGS

FIG. 1 is an elevational view of an apparatus made in accordance with the present invention, certain parts being shown in section for the sake of clarity, the sectional view being taken along line 1—1 in FIG. 5;

FIG. 2 is an elevational view of the intermediate gear support shown in FIG. 1, this gear support being symmetrical;

FIG. 3 is a view of a modified gear support with a certain amount of eccentricity;

FIG. 4 is still another modification of the gear support with a greater amount of eccentricity than the FIG. 3 support;

DESCRIPTION OF A PREFERRED EMBODIMENT

Figure 6:
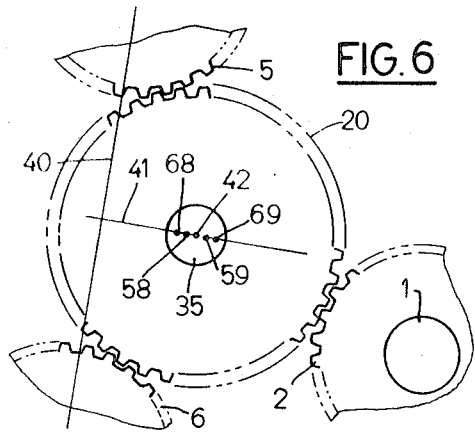
FIG. 6 is a fragmentary diagrammatic view of certain of the gears shown in FIG. 5.

The present invention provides a power transmitting drive apparatus for distributing power from a single input to a plurality of outputs and utilizing a common housing for different gear ratios to be employed by the apparatus. It is only necessary with the present invention to change input and intermediate gears and intermediate gear supports. However, the openings for the gear supports are common to all gear ratio arrangements. There is no need to form additional bores in the housing for the precise ratio of gears to be selected.

More specifically, the present invention includes a power input shaft 1 to which is fixed an input gear 2, the shaft 1 being driven from a power source such as a flywheel 3 of an internal combustion engine E and a clutch, such as for example, the interleaved friction plate type clutch C. The shaft 1 is suitably journalled in an anti-friction bearing assembly 4 in the housing H of the apparatus. Also mounted in the housing at fixed locations are the four power output means in the form of output gears 5, 6, 7 and 8. The mountings of each of these output gears are similar and only one will be described in detail. For example, as shown in FIG. 1, the output gear 6 is journalled in the pair of anti-friction bearing assemblies 10 and 11, which are supported in the sidewalls 12 and 13, respectively of the housing. Gear 6 has an internal spline for receiving shaft 6a of a power consuming mechanism, such as a pump P. The output gears 5, 6,7 and 8 are thereby mounted at a fixed location within the housing and need not be changed as to size in order to effect different gear ratios, as will presently appear.

The apparatus also includes intermediate power transmitting means in the form of idler gears or intermediate gears 20 and 21. Gear 20, for example, is located between and in constant mesh with the output gears 5, 6, and drives the output gears from the power it receives from the drive or input gear 2 with which it is also in constant mesh. Similarly, gear 21 is in constant mesh with the output gears 7 and 8 and also with the input or drive gear 2, and thereby transmits power from the rotatable power input shaft 1 to the output shafts 7a and 8a of gears 7 and 8.

Supports are provided for adjustably mounting the intermediate gears in the housing and as the means for mounting the gear 20 is similar to or the same as that for mounting gear 21, only one such support will be described. An opening 24 (FIG. 1) is formed in the sidewall 13 of the housing and this opening can be used for gears of various sizes. A gear support 30 is provided for gear 20 and includes a flange portion 31 through which the bolts 32 extend for threadable engagement in the housing H. Thus, the support 30 is removably secured in the opening 24 of the housing. The support also includes a cylindrical shoulder portion 33 which forms a snug fit with the opening 24 so that the support is firmly mounted in the housing. The support also includes an inwardly extending cylindrical portion 35 of smaller diameter, and in the case of the support 30 shown in FIGS. 1 and 2, this inwardly extending portion 35 is concentric with the center of the shoulder portion 33 of the support 30. The gear 20 is mounted on the inwardly extending cylindrical portion 35 by means of the anti-friction bearing assemblies 37 and 38. In the particular arrangement shown, the gears 5, 6, 7 and 8 are of the same size and tooth number as power input gear 2 and therefore, a one-to-one ratio is provided between the input and output of the apparatus.

Figure 7:
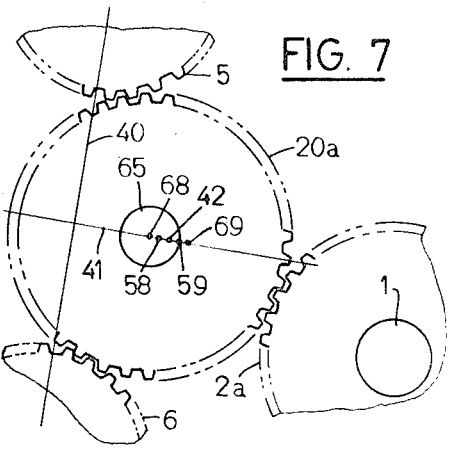
FIG. 7 is a view similar to FIG. 6, but showing a different intermediate gear support and a different intermediate gear and input gear from those shown in FIG. 6.
Figure 5:
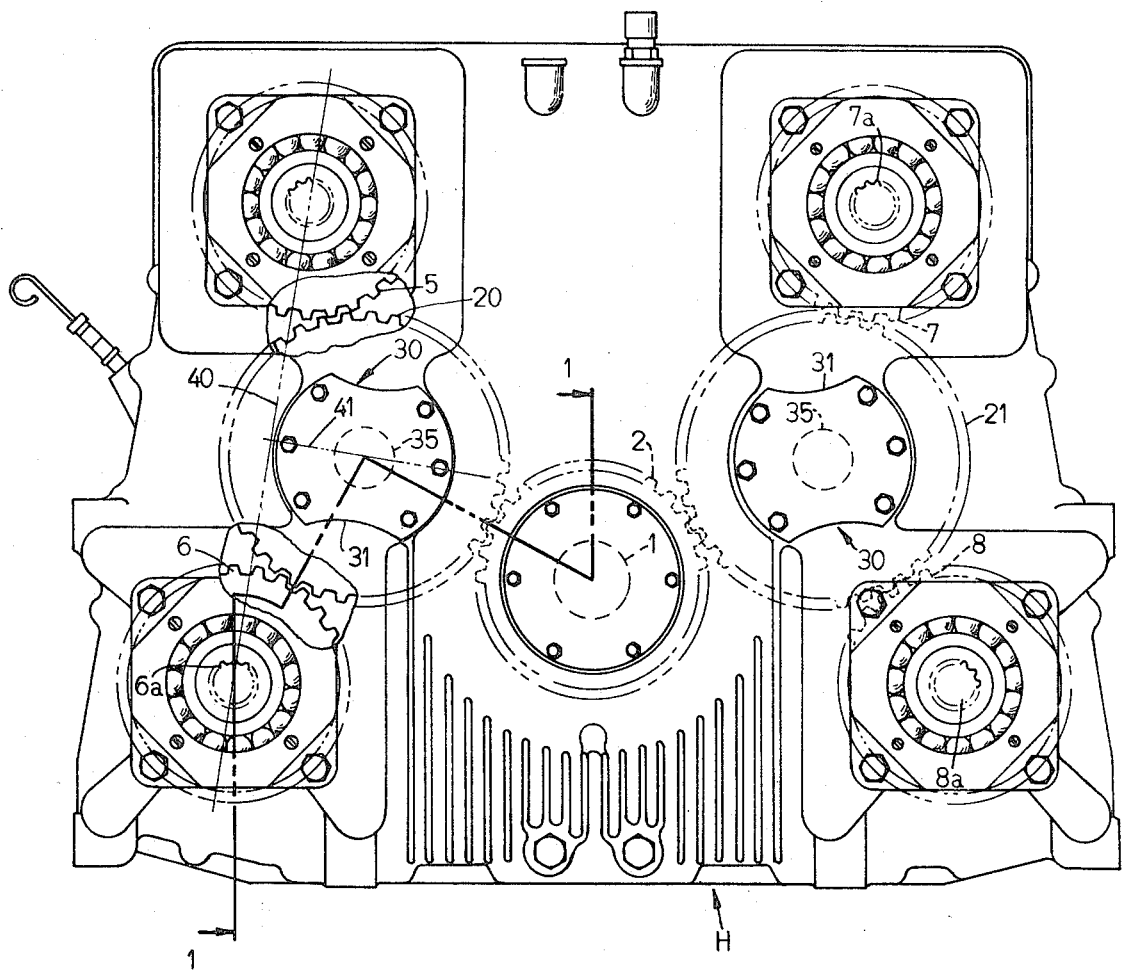
FIG. 5 is a transverse view of the apparatus shown in FIG. 1, the view being taken generally along the line 5—5 in FIG. 1, certain parts being shown as broken away for the sake of clarity.

As shown in FIGS. 5, 6 and 7, a line 40 passes through the center of rotation of gears 5 and 6, another line 41 has been shown as extending at right angles from line 40 and passing through the center of rotation 42 of the intermediate gear. It is along this line 41 that the intermediate gear is adjustable depending on the degree of eccentricity of the support selected as shown in FIGS. 2, 3 and 4. That is to say, in addition to the support 30 having a symmetrical portion 35 shown in FIGS. 1 and 2, another support 50 (FIG. 3) can be inserted in the opening 24, which support 50 has its inwardly extending portion 55 eccentrically offset from the centerline 56 of the support 50. More specifically, the eccentric centerline 57 of portion 55 is offset by an amount X as shown in FIG. 3. If such a support 50 is used in the opening 24 for the mounting of an intermediate gear, the position of the gear 20 would be either at the location 58 or 59 depending in which direction the eccentric distance X is located. In other words, the support 50 may be rotated to either one of two positions in the opening 24, the two positions being 180° apart, thus shifting the centerline 57 of the offset portion 55 to either the position 58 or 59. In this manner, the single support 50 may be shifted to one position or the other so as to accommodate two intermediate gears of different size. When an intermediate gear of either a smaller or larger size is to be utilized in place of gear 20 in FIG. 6, then the input gear 2 must correspondingly be of a larger or smaller size, respectively, so as to provide constant mesh in proper mating relationship with the intermediate gear.

If it is desired to utilize intermediate gears of still other sizes, another adapter 60 (FIG. 4) can be utilized and which has an eccentric distance Y which is greater than the eccentric distance X. In other words, the eccentric distance Y between the centerline 66 of the cylindrical shoulder portion 63 and the centerline 67 of the inwardly extending cylindrical but eccentric portion 65 is greater than the corresponding eccentric distance of support 50. Thus, when the support 60 is utilized to support the intermediate gear, the support 60 is mounted by its shoulder 63 in the opening 24 and the eccentric or offset portion 65 of the support 60 can be positioned in one direction or another, 180° apart. For example, as shown in FIG. 7, when the eccentric portion 65 is mounted in one position its centerline 67 assumes the position shown by numeral 68, and when rotated to a position 180° therefrom, it assumes the position as shown by numeral 69. Thus, the support 60 also provides two positions for different size intermediate gears, such as 20a, which are thus located along the line 41 which is normal to the line 40 passing through the center of rotation of the two power output means 5 and 6 that mesh with the intermediate gear 20a. The input gear 2a must be of a proper size to accommodate the size intermediate gear used with support 60.

RECAPITULATION

With the present invention, a power transmitting drive apparatus is provided for a common housing with openings for mounting intermediate gears of different sizes. Support means are provided for the intermediate gears and which enable the intermediate gears to be selectively positioned in different positions along a line extending normal to a line passing through the center of rotation of the corresponding output gears. A total of five positions for the intermediate gears are provided by the use of only three different gear supports. The output gears remain fixed and are of a fixed size, while the intermediate gears and input gear can be selectively changed to effect different ratios. There is no need to bore additional or different holes in the housing to effect different ratios.

I claim:

1. A power transmitting drive apparatus for transmitting power from a single input shaft to a plurality of output gears, said apparatus comprising, a housing, means for rotatably mounting an input shaft in said housing and an input gear fixed to said shaft, at least two output gears rotatably journalled in said housing at fixed locations, an opening in said housing, an intermediate gear rotatably journalled within said housing and in constant mesh with said output gears and with said input gear, an eccentric support for adjustably mounting said intermediate gear in said housing, said support having a mounting portion for mounting in said opening and an inwardly extending eccentric portion eccentrically arranged with respect to said mounting portion, said support being removably attached to said housing and mounted in said opening and having its said eccentric portion extending into said housing, said intermediate gear being rotatably journalled on said inwardly extending eccentric portion whereby said support may be removed from said opening and replaced with a support having an inwardly extending portion of different eccentricity to thereby accommodate an intermediate gear of different size in constant mesh with said output gears, said eccentric support being adjustably positioned in said opening to position its eccentric portion in either one of two positions centrally along a line extending normal to a line through the center of rotation of said output gears.

2. A power transmitting drive apparatus for transmitting power from a single source to a plurality of power consuming mechanisms, said apparatus comprising, a housing, rotatable power input means positively positioned within said housing and operatively connected to a source of power, at least two intermediate power transmitting means rotatably driven by said power input means and supported within said housing by supports, each of said intermediate means driving a plurality of power output means positively positioned and supported within said housing and operatively connected to said power consuming mechanisms, the improvement comprising each of said supports having an eccentric portion on which intermediate means is rotatably mounted, said support being removably secured to said housing and being rotationally adjustable to position its eccentric portion in either one of two positions located along a line extending normal to a line passing through the center of rotation of the two power output means which mesh with its intermediate means.

3. A four pump drive apparatus for transmitting power from a single power source to each of a plurality of fluid pumps, said apparatus comprising: a housing, a drive gear located and rotatably supported within said housing and being operatively connected to a source of power, a pair of idler gears driven by said drive gear and supported within said housing, said idler gears being supported by supports mounted in openings formed in said housing, four power output gears operatively connected to and driving four pumps, said output gears each being rotatably supported in said housing with a pair of said output gears being driven by each of said idler gears, said supports each comprising an eccentric portion on which an idler gear is rotatably mounted, said support being adjustably mounted in said housing openings to position its eccentric portion in either one of two positions located along a line extending normal to a line passing through the center of rotation of the two output gears which mesh with its idler gear, whereby each of said idler gears can be mounted with its center of rotation positioned at various locations, and different sized idler gears can be utilized to drive each pair of output gears.

* * * * *